United States Patent [19]

Matsumoto et al.

[11] Patent Number: 5,133,054
[45] Date of Patent: Jul. 21, 1992

[54] DATA TRANSMISSION APPARATUS FOR AUTONOMOUSLY AND SELECTIVELY TRANSMITTING DATA TO A PLURALITY OF TRANSFER PATH

[75] Inventors: Satoshi Matsumoto, Tenmadainishi; Souichi Miyata, Nara, both of Japan

[73] Assignee: Sharp Kabushiki Kaisha, Osaka, Japan

[21] Appl. No.: 259,850

[22] Filed: Oct. 19, 1988

[30] Foreign Application Priority Data

Oct. 20, 1987 [JP] Japan .................. 62-265740
Jan. 22, 1988 [JP] Japan .................. 63-12782

[51] Int. Cl.⁵ .................. G06F 13/14; G06F 13/38
[52] U.S. Cl. .................. 395/250; 364/239;
364/260.2; 364/268; 364/938; 364/939;
364/943.91; 364/DIG. 1
[58] Field of Search ... 364/200 MS File, 900 MS File

[56] References Cited

U.S. PATENT DOCUMENTS

| | | | |
|---|---|---|---|
| 4,456,956 | 6/1984 | El-Gohary et al. | 364/200 |
| 4,500,985 | 2/1985 | Chang | 370/14 |
| 4,542,457 | 9/1985 | Mortensen | 364/200 |
| 4,872,003 | 10/1989 | Yoshida | 340/825.04 |

Primary Examiner—Thomas C. Lee
Assistant Examiner—Ayni Mohamed

[57] ABSTRACT

A data transmission apparatus including an input-side data transmission path having a first-stage data transmission path, a second-stage data transmission path and a plurality of output-side data transfer paths is provided. When data, which include an identifier for designating the output-side data, transfer path are carried on the input-side transmission path, a comparison/decision logic unit compares the identifier in the data to be transferred and a data destination bit separately supplied thereto. The compared results are supplied to a branch control which produces a select bit for specifying one of the plurality of the outgoing data transfer paths. The incoming data together with a sending signal are passed through the first and second stage input-side data transmission paths toward the plurality of the output-side data transfer paths. The data are then transferred through one particular output-side data transfer path selected by the application of a select bit supplied thereto.

7 Claims, 5 Drawing Sheets

DATA TRANSMISSION APPARATUS FOR AUTONOMOUSLY AND SELECTIVELY TRANSMITTING DATA TO A PLURALITY OF TRANSFER PATH

BACKGROUND OF THE INVENTION

1. Field of the Invention

The present invention relates to a data transmission equipment capable of autonomously and selectively transmitting data received at arbitrary time intervals to any of a plurality of parallel transfer paths.

2. Description of the Related Art

In processing equipment, such as an electronic computer, a plurality of processing units are communicatively coupled by digital signals, for performing data processing. In general, contents of data processing thus performed in a distributed manner are varied with the processing units, while data required for such processing and results obtained in the respective processing units are different from each other. When interconnection is performed for each data processing required for data transfer by an input/output port in order to couple such a plurality of processing units, hardware is extremely complicated and the size and the cost of the entire apparatus increases.

The inventors have proposed a data transmission unit which can transmit different types of data groups through the same data transmission path in Japanese Patent Laying-Open Gazette No. 174857/1987.

FIG. 1 is a block diagram schematically showing the data transmission unit proposed by the inventors.

Referring to FIG. 1, a brief description is made for the data transmission unit, which branches data to two transmission paths for transmitting the data. Each of the data transmission paths 1, 7 and 8 illustrated in FIG. 1 is formed by a data register for transmitting data and a transfer control part. An identifier transmission path 2 is provided in parallel with the data transmission path 1. The identifier transmission path 2 is adapted to transmit an identifier called a tag. This identifier indicates whether the data received on the data transmission path 1 is to be transmitted to the data transmission path 7 or the other path 8.

When both of the data transmission paths 7 and 8 are empty to enable data transmission, subsequent data transmission paths (not shown) supply UK signals 5a and 6a to control parts 5 and 6 respectively. Similarly, UL signals 5d and 6d from preceding stages of the data transmission paths 7 and 8 are also supplied to the control parts 5 and 6 respectively. The UL signals 5d and 6d are supplied from arbitrary data transmission paths which precede the data transmission paths 7 and 8, for indicating that the data transmission paths are empty for enabling data transmission. Upon input of the UK signal 5a, the UL signal 5d, the UK signal 6a and the UL signal 6d, the control parts 5 and 6 judge whether the data transmission path 7, the path preceding the data transmission path 7, the data transmission path 8 and the patch preceding the data transmission path 7 are empty respectively, to transmit data, which may be theretofore held, to subsequent stages, and enter active states for enabling branch control of subsequent input data.

A NOR gate 4 receives from the control parts 5 and 6 the signals 5b and 6b for indicating that the paths are empty and activated, and supplying an AK signal to the data transmission path 1 and the identifier transmission path 2. Thus, data transmission from the control parts 5 and 6 to the data transmission paths 7 and 8 is authorized or inhibited while branching/transmission of data from the data transmission path 1 to the control part 5 and 6 is authorized or inhibited by the UK and UL signals from the data transmission paths 7 and 8 and the paths preceding the data transmission paths 7 and 8, depending on whether or not the preceding transmission paths are empty.

The identifier transmission path 2 supplies an identifier decoding part 3 with an identifier, which indicates that the data received on the data transmission path 1 is to be transmitted to the data transmission path 7, for example. The identifier decoding part 3 decodes the identifier received from the identifier transmission path 2 and supplies a control signal 5c to the control part 5 for activating the transmission path. Thus, the data received from the data transmission path 1 can be transmitted to the data transmission path 7 through the control part 5. When the identifier transmission path 2 supplies the decoding part 3 with an identifier for indicating that the data is to be transmitted to the data transmission path 8, on the other hand, the identifier decoding part 3 supplies a control signal 6c to the control part 6 for activating the transmission path. Thus, the data received on the data transmission path 1 can be transmitted to the data transmission path 8 through the control part 6.

Within the data transmission paths 7 and 8 and the transmission paths preceding the data transmission paths 7 and 8, when the data transmission path 7 currently holds or transmits data, for example, the UK signal 5a is not supplied to the control part 5. Also when the transmission path preceding the data transmission path 7 currently holds or transmits data, the UL signal 5d is also not supplied to the control part 5. Thus, the control part 5 judges whether the data transmission path 7 or the transmission path preceding the data transmission path 7 is currently in transmission or in a busy condition for storing data inputted in a register (not shown) included in a control part 10 while supplying a high-level signal to one input terminal of the NOR gate 4. Thus, the NOR gate 4 is closed so that the AK signal is not supplied to the data transmission path 1 and the identifier transmission path 2.

In other words, when any of the data transmission paths 7 and 8 and the transmission paths preceding the transmission paths 7 and 8 currently holds or transmits data while the control parts 5 and 6 hold data, data received on the data transmission path 1 is not inputted in the control parts 5 and 6 but the data is held in the data transmission path 1. When the data transmission path 7, the transmission path preceding the data transmission path 7, the data transmission path 8 or the transmission path preceding the data transmission path 8 completes data transmission to cause transition from a busy condition into an empty state, the control part 5 or 6 is activated. Thus, the data held in the data transmission path 1 can be autonomously branched again in accordance with the identifier.

In the distributed data processing environment, a plurality of data processing equipment must conventionally be interconnected by providing each processing equipment with a plurality of data transmission units and associated input-output ports for different data groups to be processed. This conventional arrangement makes the hardware extremely complicated in construction and bulky in size with an accompanying high cost.

SUMMARY OF THE INVENTION

It is, therefore, a primary object of the invention to provide a data transmission equipment for transmitting different types of data groups from the same incoming data transmission path to a desired one of a plurality of data transfer paths selected by a data destination identifier included in the data to be transmitted for thereby reducing hardware interconnections.

Briefly stated, there is provided according to the invention a data transmission equipment for autonomously and selectively transmitting data on an incoming transmission line which are sent in at varying time intervals which includes a destination identifier for selecting the outgoing data transfer path, to any desired one of a plurality of parallel outgoing data transfer paths. The data transmission equipment includes a data branch or a switching control for sending out data in terms of a preselected number of words by generating select a bit for designating any one of the plurality of the parallel outgoing transfer paths based on the data destination identifier contained in the data to be transmitted.

The data transmission equipment of the present invention is capable of autonomously transferring different types of incoming data groups to a desired outgoing transfer path even if the incoming data are carried in at varying intervals. Thus, the present equipment effectively eliminates the need for providing separate and exclusive hardware interconnections for different sorts of data groups on the one hand, and the need for a high performance input/output ports on the other hand. The equipment of the present invention can also accept and receive the amount of data carried in through the incoming transmission path to its full capacity and send the data over to any selected outgoing transfer path without a transfer delay. In the present sense, this invention provides a highly reliable and economical transmission equipment capable of high-speed data transfer.

In a preferred embodiment of the invention, the data path on the input side of the equipment comprises an input-side data holding unit for holding incoming data, and a input-side data transfer unit for transferring the data held in the input-side data holding unit upon receiving a command pulse signal from a succeeding data transfer path for instructing the data transfer and a sending signal from a preceding data path for qualifying the data transfer. The outgoing or output-side data path comprises an output-side data holding unit for holding the data transmitted from the incoming data path, and an output-side data transfer unit for transferring the data held in the input-side data holding unit when supplied with a command pulse signal from a succeeding data path.

The data transmission equipment according to a preferred embodiment of the invention is capable of autonomously and selectively transferring data asynchronously sent in.

According to a preferred embodiment of the invention, the branch or switching control includes a comparator unit which compares a data destination identifier contained in the data to be transmitted and a data destination bit for designating an outgoing data path to be selected. The branch control also includes a select bit generator which produces a select bit for selecting any one of a plurality of outgoing parallel data paths through which the data are transferred based on the compared results obtained in the comparator.

With this arrangement of the invention, the data are transferred to a desired data path based on a predetermined data destination bit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
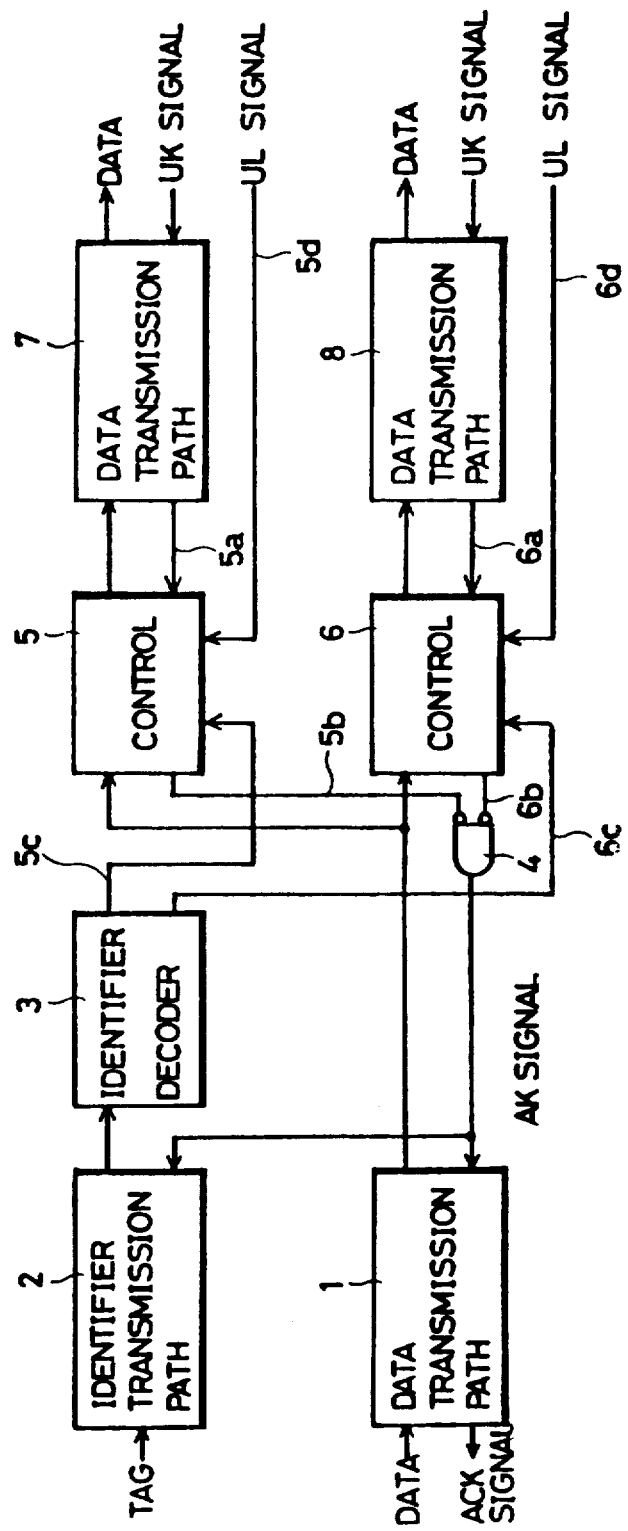
FIG. 1 is a block diagram illustrating a general arrangement of a prior-art data transmission equipment.
Figure 2:
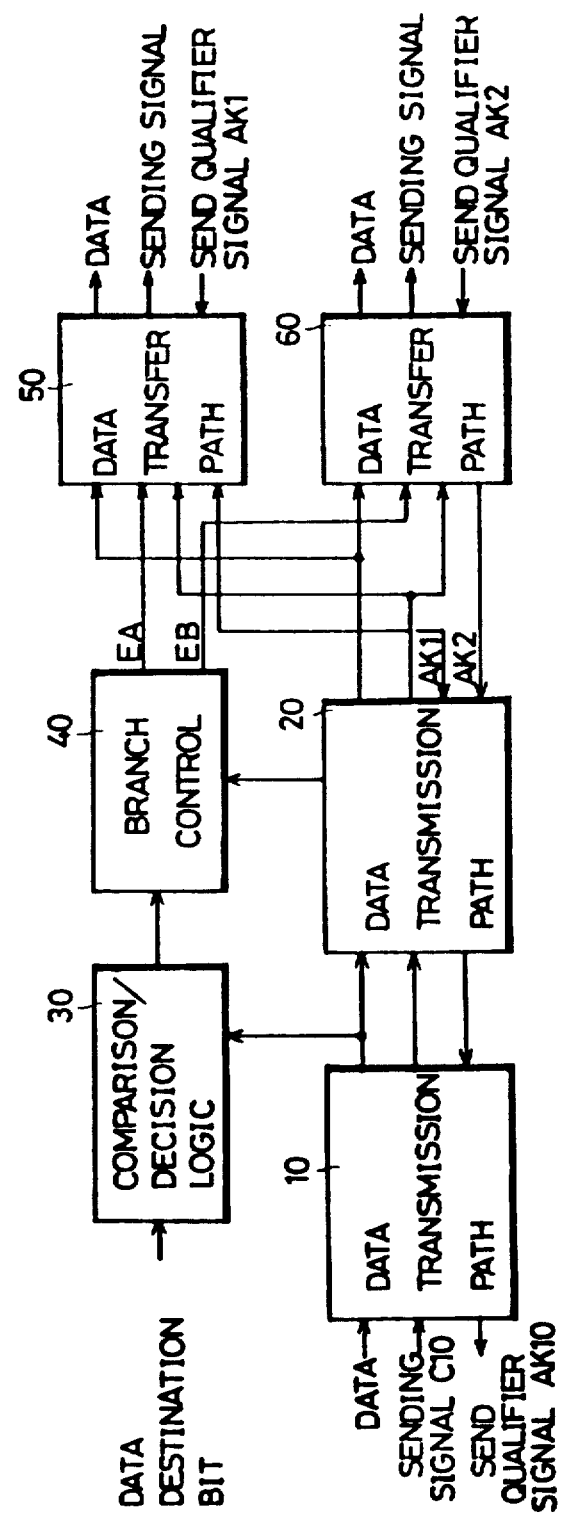
FIG. 2 is a block diagram illustrating a general arrangement of a data transmission equipment according to one preferred embodiment of the invention.

Referring to FIG. 2, an overall arrangement of a data transmission equipment is illustrated by a block diagram according to a preferred embodiment of the invention.

The data transmission equipment of the illustrated embodiment is designed to transfer incoming data sent in through input-side or incoming data transmission paths 10 and 20 over to either of the two output-side or outgoing transfer paths 50 and 60. The input-side transmission path 10 is supplied with data organized in the form of packets and with a sending signal C10 for commanding data send-out from a preceding data path (not shown). The data transmission path 10 supplies a signal AK10 for qualifying the data transfer to the preceding data path. As will be described in detail with reference to FIG. 3, the data transmission path 10 includes a data hold unit and a data transfer control. The data transmission path 10 operates to transmit the incoming data to the next data transmission path 20 on one hand, and to supply a destination identifier contained in the transmitted data for designating the outgoing data path to a comparison/decision logic unit 30.

The comparison/decision logic unit 30 is separately supplied with a data destination bit for the selection of the outgoing data path. Thus, the comparison/decision logic unit 30 makes the comparison between the data destination bit and the destination identifier, and provides the obtained results to a switching or branch control 40. The branch control 40 functions in response to the compared results to provide a select bit EA for selecting an outgoing data transfer path 50 or a select bit EB for selecting the other outgoing data transfer path 60. When supplied with a transmission qualifying signal AK1 or AK2 from the output-side data transfer paths 50 and 60, the input-side data transmission path 20 carries the data and the sending signal C10 over to the output-side data transfer paths 50 and 60. The data transfer paths 50 and 60 operate to transmit the data only when the paths are supplied both with the select bits EA and EB, respectively, from the branch control 40 and with the transmission qualifying signals AK1 and AK2, respectively, from a succeeding transfer path (not shown).

The operation of the data transmission equipment is more specifically described with reference to FIG. 2. In the initial stage of operation, when the outgoing transfer paths 50 and 60 are ready for the transmission of data, the paths send the transfer qualifying signals AK1 and AK2 back to the input-side data transmission path 20.

As the data to be transmitted come in on the input-side data transmission path 10, the incoming data together with the sending signal C10 are carried over to the other input-side transmission path. The destination identifier included in the transmitted data is then diverted to the comparison/decision logic unit 30, and the data destination identifier for designating the outgoing data path is compared with the data destination bit separately supplied to the logic unit.

When the destination identifier matches with the data destination bit, the comparison/decision logic unit 30 produces a "L" level MATCH signal. If the destination identifier does not match with the destination bit, then the logic unit generates a "H" level MATCH signal. Upon receipt of the "L" level MATCH signal, the branch control 40 selects and supplies the select bit EA for the data path 50. Upon receiving the "H" level MATCH signal, the branch control 40 produces the other select bit EB for the data path 60.

It should be pointed out here that it is not possible to select bits EA and EB simultaneously. While being supplied with the select bit EA, the outgoing data 50 operates to transmit the data from the input-side data transmission path 20 over to a succeeding data path upon receiving both the sending signal C10 from the data path and the transmission qualifying signal AK1 from the succeeding data path. It is noted that the select signal EB is not being supplied to the other outgoing data path at this point, which inhibits the sending signal from being fed from the incoming data path 20 to the outgoing data path. This in turn blocks the data transfer from the data path 20 through the data path 60 onto a data path succeeding to the data path 60.

Figure 3:
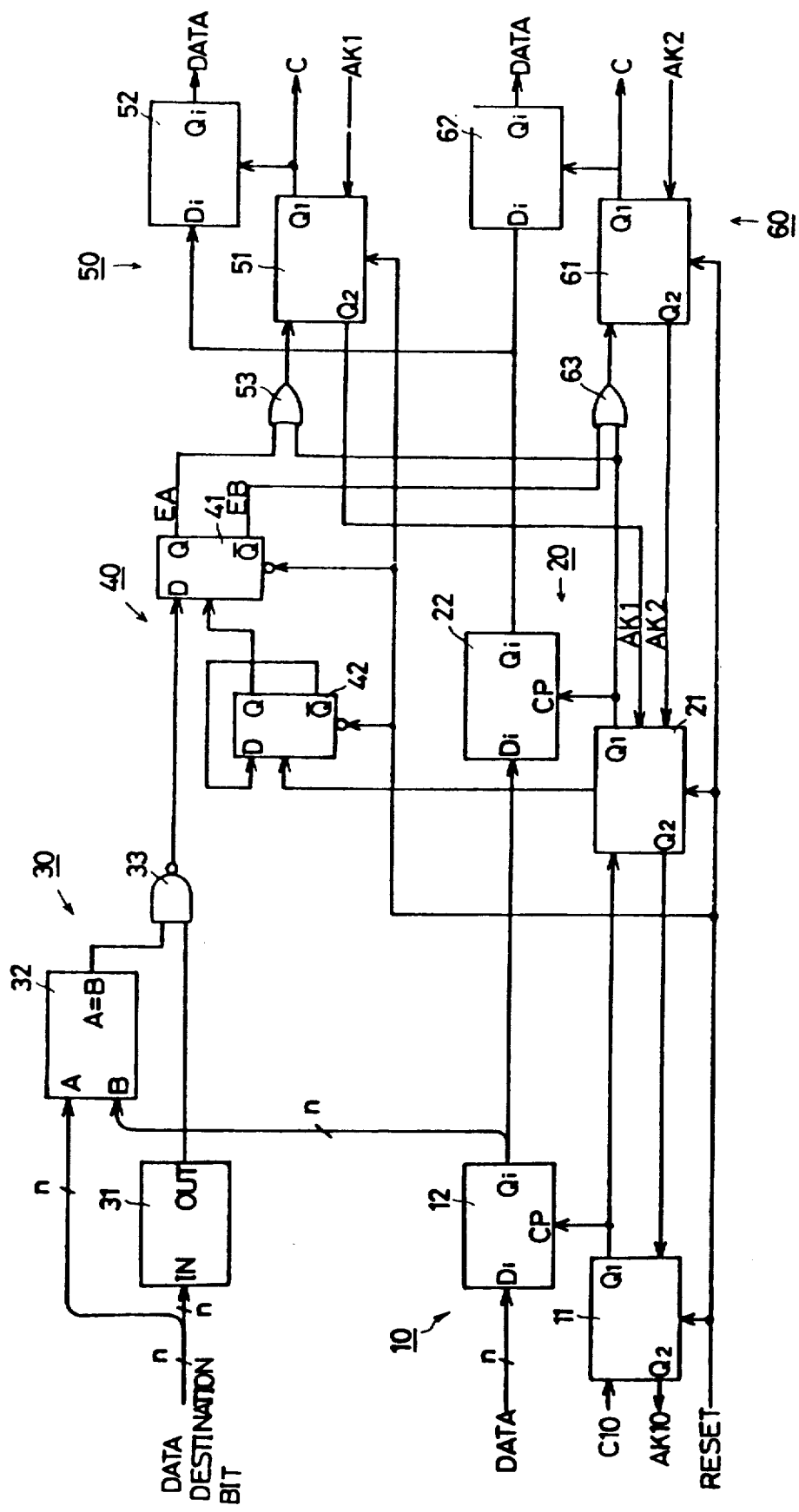
FIG. 3 is a block diagram illustrating a more detained arrangement of the data transmission equipment of FIG. 2.
Figure 4:
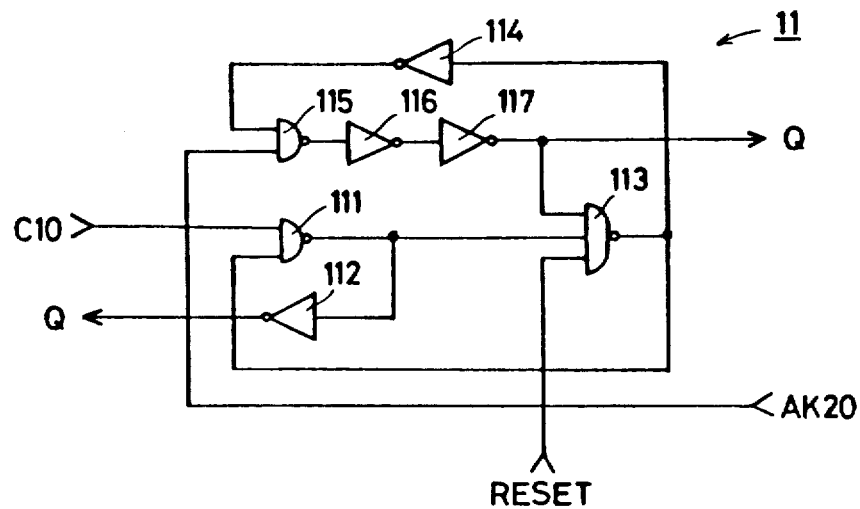
FIGS. 4 and 5 are block diagrams illustrating the arrangements of data transfer controls employed in the data transmission equipment of FIG. 3.
Figure 5:
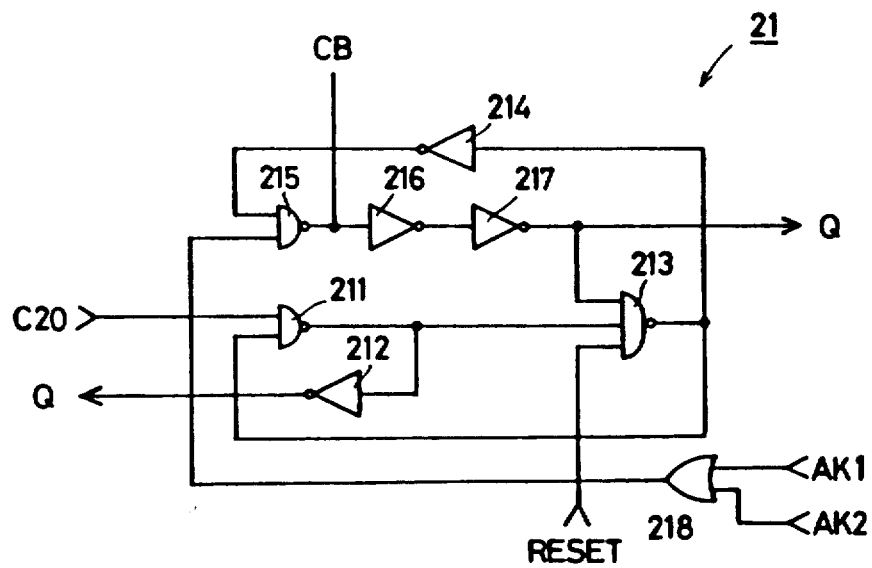

FIG. 3 illustrates in more detail an arrangement of the data transmission equipment of FIG. 2, while FIGS. 4 and 5 illustrate by a block diagram the configurations of transfer controls 11 and 21, respectively, included in the arrangement of FIG. 3.

Referring to FIGS. 3, 4 and 5, the input-side data transmission path 10 includes a transfer control 11 and a data hold unit 12. Similarly, the input-side transmission path 20 includes a transfer control 21 and a data hold unit 22. The transfer control 11 operates to transmit the data under handshaking control by the application of the sending signal C10 and the transmission qualifying signal, and the supply of the sending output signal and the transmission qualifying signal AK10. To achieve this result, the transfer control 11 includes, as illustrated in FIG. 4, two-input NAND gates 111 and 115, inverters 112, 114, 116 and 117, and a three-input NAND gate 113. The sending signal C10 is supplied to one input of the NAND gate 11, and the inverter 112 provides an output Q2. The NAND gate 115 is supplied with the sending qualifying signal AK20, while the NAND gate 115 is supplied with a reset signal. The inverter 117 provides an output Q1.

As illustrated in FIG. 5, the transfer control 21 includes two-input NAND gates 211 and 215, inverters 212, 214, 216 and 217, three-input NAND gate 213, and an OR gate 218. A sending signal C20 is fed to one input of the NAND gate 211, and the inverter 212 provides an output Q2. The NAND gate 213 is supplied with a reset signal and the inverter 217 produces an output Q1. The OR gate 218 is supplied with two different sending qualifying signals AK1 and AK2. The NAND gate 215 generates a pulse signal CB at a timing faster than the output Q1. The transfer control 21 functions to transmit data under the handshaking control.

As illustrated in FIG. 3, the comparison/decision logic unit 30 includes a bit identifying unit 31 for identifying the logical content of the data destination bit or the branch bit, a comparator 32 and an NAND gate 33. The bit identifying unit 31 receives the branch bit for the selection of the sending transfer path. The branch bit is also supplied to the comparator 32, to which the destination identifier contained in the transmitted data is diverted from the data on the input-side transmission path 10. The comparator 32 operates to make a comparison between the predetermined branch bit or the data destination bit and the destination identifier carried over in the transmitted data, and the comparator 32 supplies the MATCH signal to the one input of the NAND gate 33. The other input of the NAND gate 33 is applied with the output from the bit identifying unit 31 representing the identified content.

The branch control 40 includes D-type flip-flops 41 and 42. The output from the NAND gate 33 in the comparison/decision logic unit 30 is supplied to the D-output of the flip-flop 40, while the CB pulse signal from the transfer control 21 in the receiving-side data path 20 is applied to the clock input of the D-type flip-flop 42. The output of the D-type flip-flop 42 goes to the clock input of the other D-type flip-flop 41.

The data transfer path 50 includes a transfer control 51, a data hold unit 52, and an OR gate 53. Whereas the data transfer path 60 includes a transfer control 61, a data hold unit 62, and an OR gate 63. The transfer controls 51 and 61 are of similar construction to the transfer control 11 illustrated in FIG. 4. The data hold units 52 and 62 are of similar construction to the data hold units 12 and 22 in the receiving-side data transmission paths 10 and 20. The data hold units 52 and 62 are applied with the output Qi from the data hold unit 22 in the data transmission path 20. The one input of the OR gate 53 receives the select bit EA supplied from the output Q of the flip-flop 41, and the one input of the OR gate 63 receives the select bit EB supplied from the output $\overline{Q}$ of the flip-flop 41. The output from the OR gates 53 and 63 are applied to the input terminals for send-out signals in the transfer controls 51 and 61, respectively. The sending qualifying signals AK1 and AK2 are supplied from the output Q2 of the transfer controls 51 and 61, respectively, to the transfer control 21.

The operation of the data transmission equipment is described with reference to FIG. 3. In the initial stage of operation, a "L" level reset signal is applied both to the transfer controls 11, 21, 51 and 61 and to the D-type flip-flops 41 and 42. This application of the signal initially resets these transfer controls 11, 21, 51 and 61 and brings their outputs Q1 and Q2 to "H" levels on one hand, and resets the D-type flip-flops 41 and 42 to bring their outputs Q to the "H" level.

In this initial state, when data are fed into the data hold unit 12 and a "L" level sending signal C10 is applied to the transfer control the transfer control 11 provides a "L" level at its output Q1 because the output Q2 of the transfer control 21 is at the "H" level. The "L" level output signal from the output Q1 is supplied to the transfer control 21. The signal from the output Q1 functions as a clock pulse for the data hold unit 12 to cause the data fed into the data hold unit 12 to appear at its output Qi for transmission to the next data hold unit 22. At this point, the destination identifier contained in the data to be transmitted for designating the outgoing data path is branched off to the comparator 32 of the comparator/decision logic unit 30. The bit identifier unit 31 of the comparator/decision logic unit 30 operates to identify the logical content of a separately supplied data destination bit and applies the output representing the identified content to the NAND gate 33. The comparator 32 works to decide whether the destination identifier carried by the data and the separately supplied destination bit match with each other or not. Depending on the logic state defined by the destination bit, the NAND gate 33 generates an "L" level output or a "H" level output.

Meanwhile, when the transfer control 21 is supplied with the sending out signal C10 from the transfer control 11 and the "H" level transmission qualifying signals AK1 and AK2 from the transfer controls 51 and 61 of the data paths and 60, the transfer control 21 applies the pulse signal CB falling from the "H" level to the "L" level to the branch control 40 and, at the same time, produces the "H" level signal at its output Q1. The "H" level output signal from the output Q1 is supplied to the data hold unit 22 as a clock pulse, hence the data hold unit 22 operates to receive and hold the data released from the preceding data hold unit 12 under the control of the clock pulse.

The D-type flip-flop 42 in the branch control 40 divides the CB pulse signal applied from the transfer control 21 and provides a clock pulse at its output Q, which is applied to the succeeding D-type flip-flop 41. The flip-flop 41 also operates to latch the MATCH signal supplied from the NAND gate 33 of the comparison/decision logic unit 30 and to provide the select bits EA and EB at the outputs Q and $\overline{Q}$, respectively. When the data are to be directed to the data transfer path 50, the select bit EA assumes the "L" level. When the data are to be carried over to the data transfer path 60, the select bit EB is at the "L" level. As the select bit EA moves to the "L" level, the OR gate 53 opens to allow the send-out signal from the transfer control 21 to be applied to the transfer control 51, upon which the output level at the output Q1 goes down to the "L" level thereby causing the data hold unit 52 to receive and hold the data from the preceding data hold unit 22. It is noted that at this point the select bit EB is at the "H" level for closing the OR gate 63. Consequently, the send-out signal from the transfer control 21 is not passed on to the transfer control 61.

Figure 6:
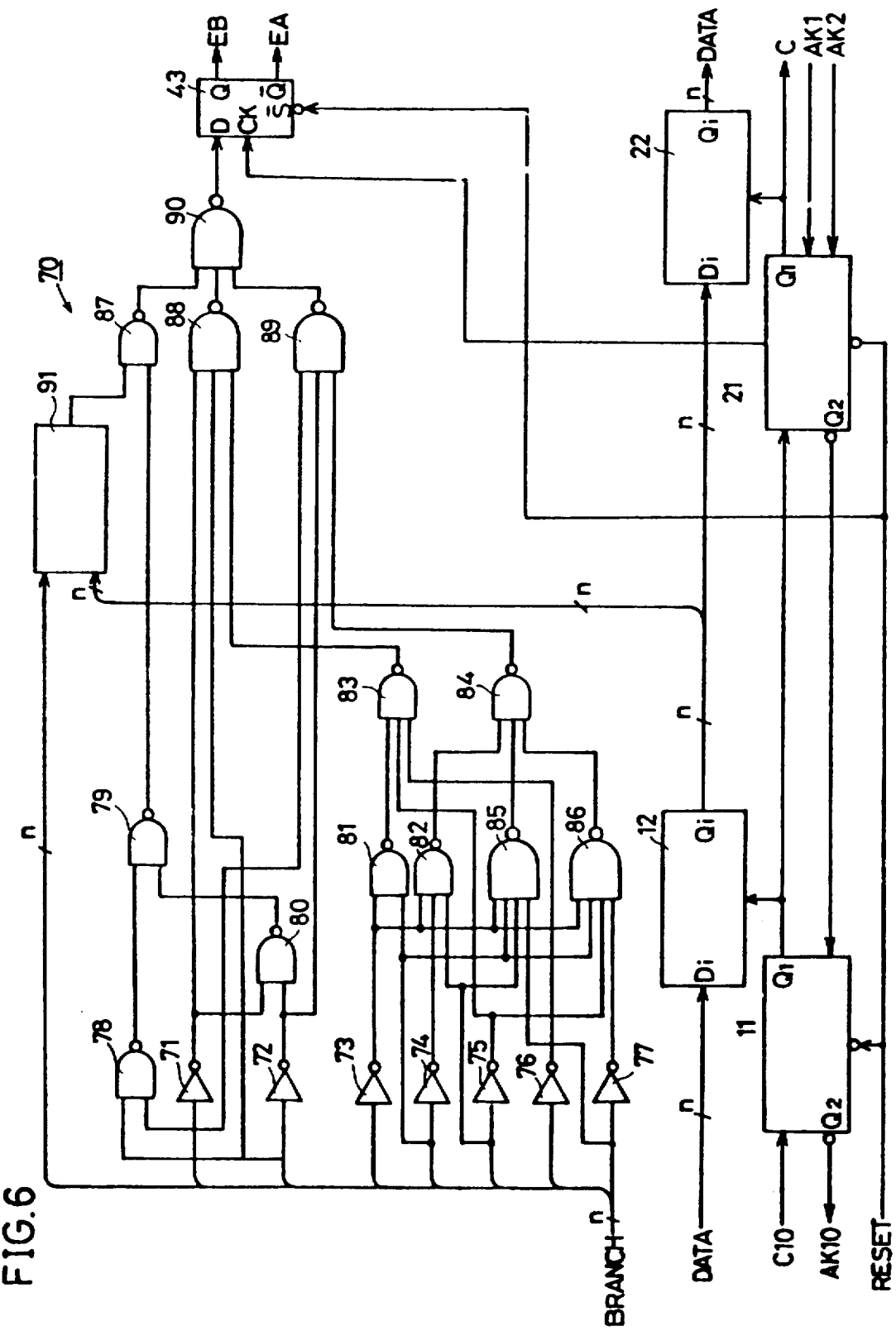
FIG. 6 is a block diagram illustrating a general arrangement of a data transmission equipment according to another preferred embodiment of the invention.

Referring to FIG. 6, a data transmission equipment according to another preferred embodiment of the invention is illustrated by a block diagram. Transfer controls 11 and 21 and data hold units 12 and 22 for the data transmission path 10 and 20 all have similar arrangements to the elements as illustrated in FIG. 3. For simplicity, the sending-side or outgoing data paths 50 and 60 are omitted in the drawing figure. The structure of the comparison/decision logic unit 70 is now described. As illustrated, the logic unit 70 includes: inverters 71, 72, 73, 74, 75, 76 and 77; NAND gate 78, 79, 80, 81, 82, 83, 84, 85, 86, 87, 88, 89 and 90; and a comparator 91. The inverters 71-77 and NAND gates 78-90 are organized so that they will specify three transfer modes with particular sets of bits in the n-bit branch or the destination bit. More specifically, the two bits in the n-bit destination bit are decoded by the inverters 71 and 72 and the NAND gates 78, 79 and 80 for providing a mode select signal to NAND gates 87, 88 and 89 for selecting one of the three transfer modes.

In the first transfer mode, the comparator 91 compares the n-bit destination bit and the n-bit identifier contained in the data to be transmitted. If the n-bit destination bit and the n-bit identifier are found to match, then the comparator 91 brings the one input terminal of the NAND gate 87 to a "L" level. Depending upon the output level of the preceding NAND gate 79, the output of the succeeding NAND gate 90 is brought to a "H" level through the NAND gate 87. The high level output from the NAND gate 90 allows the D-type flip-flop 43 to be set by the pulse signal CB from the transfer control 21 into producing the "L" level set bit EA at its output $\overline{Q}$.

The other four bits in the n-bit destination bit provide logic for specifying the destination of the data being transmitted. According to the logic circuit formed by the inverters 75 and 76, and the NAND gates 81 and 83, the four-bit signal drives NAND gate 90 to generate a "H" level output through the mode select of NAND gate 88. Likewise the other four bits in the n-bit destination bit establishes a logic circuit formed of the inverter 77 and the NAND gates 82, 85, 86 and 84, and thereby drives the NAND gate 90 through the mode selecting NAND gate 89 into providing the "H" level output.

As will be readily understood from the foregoing description, in accordance with the invention, the data are autonomously transmitted to any one of a plurality of outgoing data paths depending on the result obtained by comparing in the comparison/decision logic unit 78 the destination identifier contained in the data to be transmitted and the branch or destination bit separately supplied to the logic unit 78, and also depending on whether the outgoing transfer paths are already loaded with data or not. The data transmission equipment of the invention is capable of transferring different types of data groups coming in at various time intervals over to a desired data path in an autonomous manner. Thereby the need for providing separate data paths for different types of data to be transmitted, and for high performance input/output ports are eliminated. The data transmission equipment of the invention is also capable of receiving the data to the full capacity of the data transmission for sending the data over to the output-side data transfer path without a transfer delay. There is thus provided, according to the invention, a reliable and economic data transmission equipment capable of high-speed data transfer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission apparatus for autonomously and selectively transferring data including an identifier, comprising:
   an input-side transmission path for receiving the data at arbitrary time intervals, said input side transmission path comprising input-side data hold means and input-side transfer control means, said input-side data hold means including,
   first input-side data hold means for holding the data, and second input-side data hold means for holding data supplied from said first input-side data hold means, and said input-side transfer control means including, first input-side transfer control means for transferring the data held in said first input-side data hold means to said second input-side data hold means when a first command pulse signal from a preceding data transmission line to said input-side transmission path for transferring the data and a send qualifier signal from a succeeding data transfer path to said input-side transmission path are supplied thereto and developing a second command pulse signal, and second input-side transfer control means for transferring the data held in said second input-side data hold means and supplying said send qualifier signal to said first input-side transfer control means when said second command pulse signal from said first input-side transfer control means and said send qualifier signal from said preceding transmission line are supplied thereto;

a plurality of parallel output-side transfer paths for transferring the data from said input-side transmission path; and branch control means for providing a destination bit which designates one of the plurality of said parallel output-side transfer paths in response to said identifier included in the data received at said input-side transmission path and dispatching the data in terms of predetermined words.

2. A data transmission apparatus according to claim 1, wherein each of said parallel output-side transfer paths comprises:

output-side data hold means for holding the data transferred thereto from said input-side data transmission path; and output-side transfer control means for transferring the data held in said output-side hold means when said second command pulse signal commanding data transfer, a select bit from said branch control means and said send qualifier signal from a succeeding data transfer path are supplied thereto.

3. A data transmission apparatus according to claim 1, wherein said branch control means comprises:

comparator means for comparing said destination bit supplied thereto and said identifier included in the data transferred from said second data hold means; and select bit generator means for generating a select bit which designates one of said plurality of parallel output-side transfer paths in response to the comparison by said comparator means.

4. A data transmission apparatus according to claim 3, wherein each of said first and second input-side transfer control means comprises first and second two-input NAND gates, first, second, third and fourth inverters, a three-input NAND gate and an OR gate.

5. A data transmission apparatus according to claim 3, wherein each of said first and second input-side data hold means comprises first and second two-input NAND gates, a three-input NAND gate and first, second, third and fourth inverters.

6. A method for autonomously and selectively transferring data including an identifier, comprising the steps of:

(a) receiving the data at arbitrary time intervals by an input-side transmission path;

(b) holding the data by first input-side data hold means;

(c) holding data supplied from said first input-side data hold means by second input-side data hold means;

(d) transferring the data held in said first input-side data hold means to said second input-side data hold means when a first command pulse signal from a preceding data transmission line to said input-side transmission path for transferring the data and a send qualifier signal from a preceding data transfer path to said input-side transmission path are supplied thereto and developing a second command pulse signal by first input-side transfer control means;

(e) transferring the data held in said second input-side data hold means;

(f) supplying said send qualifier signal to said first input-side transfer control means when said second command pulse signal from said first input-side transfer control means and said send qualifier signal from said preceding transmission line are supplied thereto;

(g) transferring the data from said input-side transmission path by a plurality of parallel output-side transfer paths; and (h) providing a destination bit which designates one of the plurality of said parallel output-side transfer paths in response to said identifier included in the data at said step (a) and dispatching the data in terms of predetermined words by branch control means.

7. A data transmission apparatus for autonomously and selectively transferring data including an identifier, comprising:

an input-side transmission path for receiving the data at arbitrary time intervals, said input side transmission path comprising input-side data hold means and input-side transfer control means, said input-side data hold means including, first input-side data hold means comprising first and second two-input NAND gates a first three-input NAND gate and first, second, third and fourth inverters for holding the data, and second input-side data hold means comprising third and fourth two-input NAND gates, a second three-input NAND gate and fifth, sixth, seventh and eighth inverters for holding data supplied from said first input-side data hold means, and said input-side transfer control means including, first input-side transfer control means comprising fifth and sixth two-input NAND gates, ninth, tenth, eleventh and twelfth inverters, a third three-input NAND gate and a first OR gate for transferring the data held in said first input-side data hold means to said second input-side data hold means when a first command pulse signal from a preceding data transmission line to said input-side transmission path for transferring the data and a send qualifier signal from a succeeding data transfer path to said input-side transmission path are supplied thereto and developing a second command pulse signal, and second input-side transfer control means comprising seventh and eighth two-input NAND gates, thirteenth, fourteenth, fifteenth and sixteenth inverters, a fourth three-input NAND gate and a second OR gate for transferring the data held in said second input-side data hold means to said first input-side transfer control means and supplying said send qualifier signal to said first input-side transfer control means when said second command pulse signal from said first input-side transfer control means and said second qualifier signal from said preceding transmission line are supplied thereto;

a plurality of parallel output-side transfer paths for transferring the data from said input-side transmission path; and branch control means for providing a destination bit which designates one of the plurality of said parallel output-side transfer paths in response to said identifier included in the data received at said input-side transmission path and dispatching the data in terms of predetermined words, said branch control means including, comparator means for comparing said destination bit supplied thereto and said identifier included in the data transferred from said second data hold means, and select bit generator means for generating a select bit which designates one of said plurality of parallel output-side transfer paths in response to the comparison by said comparator means.

* * * * *